Patented Oct. 24, 1939

2,177,254

UNITED STATES PATENT OFFICE 2,177,254

PROCESS FOR PRODUCING CALCIUM SULPHATE

Winfield Walter Heckert, Arden, Del., assignor to E. I. du Pont de Nemours & Company, Wilmington, Del., a corporation of Delaware No Drawing. Application May 27, 1937,
Serial No. 145,051

13 Claims. (Cl. 23—122)

This invention relates to the production of finely-divided calcium sulphate suitable for use as a high-grade pigment extender or filler.

More particularly, the invention has reference to the hydration of calcium sulphate containing less combined water than the dihydrate by subjecting the same, while maintained in paste-like or thickened consistency, to relatively high shearing forces, whereby the hydrated product which results is relatively uniform and unusually fine in particle size and is adapted to readily disintegrate to non-acicular, extremely fine particle size anhydrite when dried.

Calcium sulphate hemihydrate (plaster of Paris) and soluble anhydrite, when mixed with water, readily hydrate to the well-known dihydrate, gypsum. The particle size of such product is relatively large, non-uniform, coarsely crystalline, and mainly acicular in character, which properties render the same entirely unsuited for certain uses, particularly as a pigment extender or filler. When employed as an extender, the resultant pigment will be unusually coarse in texture and undesirably low in tinting strength, characteristics which render the product wholly unsuited in commercial pigment applications. Continued wet grinding, to reduce the particle size of the dihydrate and render the same uniform and non-coarse in texture, will prove ineffective because while some of the particles are being reduced, the remainder continue to grow with the result the ultimate product is not only unsatisfactory for pigment or other specific uses, but the prolonged and continued grinding required involves prohibitive economic losses and expense. Calcination of the resultant product will not overcome its coarse and acicular character.

It is among the objects of my invention to overcome the foregoing as well as other disadvantages in prior calcium sulphate production and to provide a process readily affording the production of calcium sulphate which is relatively minute and fine in particle size, consistently uniform, non-coarse in crystalline structure and texture, and adapted to disintegrate to non-acicular, substantially equi-dimensional particles upon mere drying or calcination. An additional and particular object of the invention is the production of calcium sulphate which is particularly suitable for use as a pigment extender or filler.

Additional objects and advantages which are afforded by my invention will be obvious from the ensuing description.

Broadly, the invention comprises hydrating calcium sulphate containing less combined water than the dihydrate, by the addition of sufficient water thereto to form a slurry mass relatively high or thick in consistency, and, during hydration, subjecting said mass to relatively high shearing forces through mechanical action, as a result of which crystal growth or particle size increase during hydration is effectively prevented.

In one practical and preferred embodiment, I charge calcium sulphate hemihydrate or soluble anhydrite into a suitable milling apparatus adapted to subject the same to vigorous agitation or kneading. Preferably, a kneader type of apparatus is employed, since such type is particularly adaptable for use in the invention. During hemihydrate or soluble anhydrite charge into the kneader (or upon its completion, if desired) water is added, preferably as rapidly as possible, and in amount sufficient to induce a plastic, viscous slurry mass of thick, paste-like consistency. Upon sufficient addition of water and attainment of desired slurry mass consistency, mechanical movement of the kneader is commenced, kneading being continued until hydration becomes complete. Hydration usually occurs after 10–20 minutes of kneading, but I preferably continue the kneading for a period of about 30 minutes. Upon completion of hydration and interruption of mechanical movement, the hydrated mass is discharged from the mill with a minimum of delay, the mass being then subjected to drying or calcination, as desired. Drying may be effected at temperatures of 110° C. or less, while if calcination is effected, temperatures of the order of 200° C. or higher may be utilized.

Alternatively, the slurry, prior to discharge from the kneader, may be further thinned with water, filtered, and then subjected to desired heat treatment. Whatever the subsequent treatment, the mass is discharged from the kneader with a minimum of delay, since continued contact of the fine particles obtained would induce crystal growth. Such crystal growth or particle size increase may be effectively avoided if slurry removal and discharge from the kneader is accomplished within a time period not to exceed substantially 30 minutes. Accordingly, if the total time consumed from commencement of slurry removal to commencement of the drying operation does not entail more than substantially 30 minutes of time, it will be found that deleterious particle size growth or increase will be prevented.

In order that my invention may be more clearly understood, the following specific examples are given, each of which is merely illustrative of particular embodiments, and not in limitation of the scope or underlying principles of my invention:

Example I 155 parts by weight of calcium sulphate hemihydrate were charged into a kneader type of mixer. Then 845 parts by weight of water were introduced and rotation of the kneading device was started immediately, at room temperature. On conclusion of 30 minutes' operation the mass had the consistency of a stiff paste. In order to conveniently remove from the mill, 100 parts by weight of water, viz., sufficient to obtain a thin flowing paste, were added to the kneader and operation thereof continued for about two minutes. At the end of this time the slurry product was mobile and flowed from the apparatus directly to a rapid filtering device. The product was then died in the usual manner and disintegrated.

On subjecting the slurry mass recovered as a result of the foregoing operation to drying at a temperature of less than substantially 65° C., the resultant product was found to comprise very fine particles substantially uniform in character and ranging from substantially 3 to 7 microns in length and of a composition represented by the chemical formula $CaSO_4.2H_2O$. Similarly, when the slurry mass was dried at substantially higher temperature or calcined at a temperature in excess of 200° C., the material became anhydrous and disintegrated spontaneously into substantially wholly non-acicular apparently amorphous particles of less than 1.5 microns in diameter.

Example II 200 parts by weight of ground natural gypsum were heated at 140° C. for about 6 hours. The resulting product showed a loss on ignition of 0.9%. This substantially dehydrated product was then charged into a kneader type mixer and a quantity of water equal to about 5½ times the weight of the calcium sulphate and containing methyl cellulose equal to .2% of the weight of the calcium sulphate were introduced into the kneader. The kneader was operated for 30 minutes, at the end of which time the calcium sulphate was completely hydrated. Sufficient water was added to the kneader to facilitate removal of the reaction mass from the mill. The reaction mass was filtered and the calcium sulphate product when dried at about 65° C. yielded a superior pigment extender consisting of fine particle size gypsum. When calcined at temperatures of from about 200° to 980° C. the product was of even finer particle size and consisted almost entirely of non-acicular anhydrous calcium sulphate particles of an average diameter of from 1 to 2 microns. When blended with commercial pigment titanium dioxide at the rate of 30% $TiO_2$, 70% $CaSO_4$ the excellent pigment quality was indicated by the high tinting strength, 205%, as determined by substantially the method described by Booge and Eastlack on page 11 of the April 16, 1924 issue of "Paint, Oil and Chemical Review." Commercial pigments of similar composition, when subjected to the identical tinting strength test, yielded values of from 190% to 200%.

Additionally, when paint films containing this improved calcium sulphate product were examined they were found to be essentially free of large objectionable grit particles such as resulted when prior art products were subjected to the same treatment, viz., ground at the same paint mill setting and in the same vehicle formulation.

Example III

Plaster of Paris of good color, prepared from precipitated gypsum was added to a kneading apparatus and water was added to reduce the mass to a plastic pasty condition. While the kneader was continued in operation, further amounts of water were added at intervals to maintain the reaction mass at a plastic pasty consistency. At the end of about 30 minutes the reaction mass was removed from the kneader, filtered and dried at 120° C. The time elapsing between removal from the mill until commencement of the drying operation was less than 30 minutes. The product was later calcined at temperatures ranging from 200° C. to 980° C. and in all instances consisted of fine particle size anhydrous calcium sulphate of excellent color and admirably adapted for blending with prime pigments such as titanium dioxide for preparation of superior composite pigments. When blended with such prime pigments the pigment properties, especially the good color, the high tinting strength and the fine texture evidenced the excellent quality of my novel product.

Example IV 155 parts by weight of soluble anhydrite prepared by dehydrating ground natural gypsum and 850 parts by weight of water containing 4 g./l. of cerous sulphate were charged into a kneading device as described in Examples I, II and III. After kneading for 20 to 30 minutes the soluble anhydrite was found to have been converted entirely to gypsum, largely in the form of very fine acicular particles ranging from about 3 to 7 microns in length. The charge was filtered. The total time elapsed from the end of the kneading hydration operation until drying was initiated was less than 30 minutes. When this dried product was calcined at temperatures of 200° C. to 980° C., the fine acicular particles were found to have spontaneously disintegrated to substantially equidimensional particles of anhydrous calcium sulphate with an average particle size of from 1 to 2 microns.

The calcium sulphate product obtained was of excellent quality and when blended with commercial pigment titanium dioxide produced improved pigments of excellent color, high tinting strength and fine texture.

Example V

Gypsum was precipitated by reacting milk of lime with sulphuric acid. This gypsum product was separated from its mother liquor and subjected to drying at 160° C. The product containing about 4% of combined water was hydrated while subjecting the same to shearing forces in a kneader type mixer with about seven times its weight of water. The fine particle size gypsum resulting was filtered, dried and calcined. The calcined product consisted of anhydrous calcium sulphate of non-acicular form and because of its excellent color and fine particle size was ideally adapted to serve as an extender in preparing composite pigments comprising titanium dioxide and calcium sulphate. The excellent color and fine particle size were reflected in the quality of the composite pigment, the latter being of fine color, excellent tinting strength and fine texture.

As has been indicated, the particle size of the hydrated calcium sulphate resulting from my invention will be characteristically small, uniform and non-coarse in crystalline structure and texture. On dehydration by drying or calcination treatment, the anhydrous product will be free from acicular crystals, and will exhibit the unique, unexpected and desirable property of spontaneous disintegration into substantially equidimensional, insoluble anhydrite having a particle size average of not over substantially 1-2 microns. Possessing these attributes the resultant product will be readily adapted for particular use as a pigment extender. This spontaneous disintegration into equidimensional, extremely fine particle size anhydrite arises by reason of my novel method of calcium sulphate treatment, i. e., effecting hydration of the calcium sulphate while the same is in a substantially thickened or paste-like state during concurrent, relatively high shearing action treatment. The high or thick consistency of the mass during hydration provides a continual supply of new crystal particles of microscopic dimension, which act as growth centers for new crystals, thereby preventing growth of larger ones. These growth centers appear to form weak spots in the crystals in which small acicular crystals of gypsum may form, such crystals really comprising a series of small, non-acicular particles which are held relatively loosely together, as distinguished from prior and normal gypsum products which are bonded by strong attractive forces which oppose disintegration. Spontaneous disintegration also arises by reason of the fact that the continual shearing action applied to the crystals prevents accumulation of concentrated adsorption layers of calcium sulphate.

While hereinbefore specific ratios of water to hemihydrate have been employed for the purpose of inducing desired consistency to the calcium sulphate mass subjected to shearing action and hydration, these are merely in exemplification of particular embodiments of the invention. The type of starting material and its previous history will usually determine the optimum quantity of water to be employed in making up the calcium sulphate slurry to be subjected to treatment. For instance, soluble anhydrite calcium sulphate will require a different quantity of water than the hemihydrate and various mixtures of soluble anhydrite and hemihydrate may require varying water to solids ratios in the obtainment of best results. The optimum water to solids ratio will, in most instances, be best determined by trial for each specific type of starting material and each particular milling apparatus utilized. Generally the use of a ratio of water to hemihydrate sufficient to provide a slurry mass for milling which will range in consistency from a substantially creamy to a heavy, dough-like state is contemplated. Accordingly, if the water to hemihydrate ratio is such that after substantially 30 minutes of slurry milling as a batch process the reaction mixture is still doughy or paste-like in consistency, such ratio will be found to be beneficial in the invention. In a preferred adaptation of the invention, and in order to obtain optimum benefits hereunder, I employ an amount of water equal to substantially 3-7 times the weight of hemihydrate or soluble anhydrite under treatment.

As indicated, the amount of water utilized for obtaining desired mass consistency also depends upon the type of milling apparatus employed. While the invention has been illustratively described employing a kneader type of mixer, the blades of which function to apply a preferred shearing or cutting-away action to the viscous mass, it is to be understood that other types of mixing apparatus may be utilized, provided such type is capable of exerting a relatively high shearing force upon a relatively viscous mass during mixing. Thus, for instance, apparatus such as a ball mill, a pebble mill, or a pug mill may also be employed. In instances of kneader apparatus employment, resort to thicker mass consistencies is desirable, whereas in apparatus such as a ball mill a somewhat thinner mass consistency, even to an extent approximating a somewhat liquid condition, may be required. In ball mill instances, if the consistency of mass is too heavy, free movement of the balls will be prevented. Inherently the function of a ball mill is essentially one of grinding or attrition alone, which is not conducive to the obtainment of optimum benefits under the invention, i. e., the hydration of calcium sulphate under conditions which completely prevent excessive crystal growth formation. Accordingly, where a ball mill is employed, care should be taken at all times to maintain the mass under treatment at a consistency sufficient to afford mixing by an action which is predominantly shearing in character, with only incidental grinding action.

As stated, my improved fine particle size gypsum may be subjected to drying or calcination upon completion of hydration and milling. The same may be dried at relatively low temperatures of the order of 65° C. or lower, or calcined at higher temperatures, say, of the order of 200° C., but preferably at temperatures ranging from 600° C.–950° C. Upon being subjected to suitable drying temperatures, and particularly those within the calcination ranges specified, complete and spontaneous disintegration of the product as described results.

When my improved calcium sulphate product is blended with such prime pigments as zinc sulphide, zinc oxide, titanium oxide, etc., either the gypsum product or the anhydrite product will form an excellent extender and produce a very fine high-grade composite pigment.

While my improved calcium sulphate product may be obtained as described by hydration of hemihydrate or soluble anhydrite with water alone, coupled with subsequent rapid handling of the slurry, such rapid handling may be dispensed with, provided suitable restraining agents which function to inhibit particle size growth of the initially-formed crystals are employed in the process. Accordingly, I contemplate employing restraining agents such as those specified in my previously issued United States Patents Nos. 2,044,942 and 2,018,955, wherein I appear as joint inventor with one Gordon D. Patterson.

The following crystal growth restraining agents may also be employed in the invention: methylcellulose, gelatin, soya lecithin, cellulose xanthate, starch, phenol, glyceryl borate, gum tragacanth, Irish moss, lauryl sulphuric acid, cerous salts and calcium chloride. Likewise, small amounts of the recently discovered glycollate inhibiting agents, particularly starch glycollate, as more particularly disclosed and claimed in the co-pending application of Roy William Sullivan, Serial No. 183,322, filed January 4, 1938 may be utilized in conjunction with the invention and with beneficial effects.

Although I have described my novel process as applied to hydration of either the hemihydrate or soluble anhydrite, I have found it especially practical to prepare the starting material for hydration by subjecting precipitated gypsum to heat treatment of from about 100° C.–160° C., thereby dehydrating the same at least to the extent represented by the composition of the hemihydrate. Preferably, and in order to insure that no dihydrate is present, the gypsum is dehydrated until the loss on ignition approximates 4% or less. Such a product contains less water than the hemihydrate.

Another modification of my process comprises calcium sulphate hydration in a dilute acid medium, while subjecting the hydrating mass to shearing or kneading action. This is particularly beneficial if the starting materials are derived from natural gypsum. More or less higher and other impurities are associated with the latter and when dehydrated so that it contains not more than about 6.2% of combined water and then hydrated in an acid medium while subjected to shearing forces, not only the beneficial fine particle size characteristics of my calcium sulphate products are retained, but a marked improvement in color also results, particularly if filtration is carried out while an acid condition still maintains.

While I have described my invention in its application to a batch process, it is obvious that the same may be applied to continuous or semi-continuous processes. Likewise, the starting materials, calcium sulphate hemihydrate and soluble anhydrite, or mixtures of the same, may contain minor amounts of other forms of calcium sulphate or other impurities without affecting the underlying concepts of the invention.

I claim as my invention:

1. The method of producing light weight plaster including producing a hemihydrate plaster by calcining gypsum, mixing the plaster with water in excess of that required for hydration, agitating the mixture until the plaster has reverted to dihydrate or gypsum in fine crystalline form, and recalcining the plaster at a temperature under that required for rendering the final product anhydrous.

2. The method of producing light weight plaster including calcining crushed or ground gypsum rock, mixing the calcined material with water, adding an accelerating agent to the mixture, agitating the wet mixture until it has recrystallized in a finer particle size, and recalcining the material.

3. The method of producing light weight plaster including calcining crushed or ground gypsum rock, mixing the calcined material with water, adding to the mixture an accelerating agent that will decompose or become volatilized during recalcination of the mixture, agitating the wet mixture until it has recrystallized in a finer particle size, and recalcining the material.

4. The method of producing a pure, decolorized, anhydrous, calcium sulphate of light weight, excessive bulk and very fine particle size, including mixing gypsum rock in crushed condition and calcined to a state of hydration not higher than the hemihydrate, in the presence of an acidic agent adapted for decomposing reaction with impurities in the gypsum with a considerable excess of water over that required to rehydrate the hemihydrate and in amount sufficient to form a slurry with the sulphate, agitating the wet mixture until the calcined material has crystallized in a finer particle size and in the dihydrate form, and recalcining the material to an anhydrous dead burned form.

5. A process for producing pigment-useful, finely-divided, non-acicular calcium sulphate comprising completely hydrating said sulphate by admixing water therewith in such ratio that a substantially plastic, viscous mass results, concurrently with said hydration subjecting said mass to relatively high kneading and shearing action treatment, continuing said treatment until said sulphate crystallizes in finer particle size and in the dihydrate form, and thence dehydrating the resultant product, whereby the same disintegrates into substantially equidimensional, insoluble anhydrite having a particle size average not over substantially 1–2 microns.

6. A process for producing pigment-useful, finely-divided, non-acicular anhydrous calcium sulphate comprising effecting complete hydration of said calcium sulphate by admixing water therewith in such ratio that a substantially plastic, viscous mass results, concurrently with said hydration subjecting said mass to relatively high kneading and shearing action treatment, continuing said treatment until said sulphate crystallizes in finer particle size and in the dihydrate form, and thence calcining the product recovered, whereby said product disintegrates into substantially equidimensional, insoluble anhydrite having a particle size average not over substantially 1–2 microns.

7. A process for producing pigment-useful, finely-divided, non-acicular anhydrous calcium sulphate comprising adding sufficient water to a calcium sulphate containing less combined water than the dihydrate to effect complete hydration of the same and produce a paste-like mass ranging in consistency from a thick creamy to a doughy state, concurrently with said hydration subjecting said mass to relatively high kneading and shearing action treatment, continuing said treatment until said sulphate crystallizes in finer particle size and in the dihydrate form, and thence dehydrating the resultant product, whereby the same disintegrates into substantially equidimensional, insoluble anhydrite having a particle size average not over substantially 1–2 microns.

8. A process for producing pigment-useful, finely-divided, non-acicular anhydrous calcium sulphate comprising adding sufficient water to a calcium sulphate containing less combined water than the dihydrate to effect complete hydration of the same and produce a paste-like mass ranging in consistency from a thick creamy to a doughy state, concurrently with said hydration subjecting said mass to relatively high kneading and shearing action treatment, continuing said treatment until said sulphate crystallizes in finer particle size and in the dihydrate form, and thence calcining the resultant product, whereby the same disintegrates into substantially equidimensional, insoluble anhydrite having a particle size average not over substantially 1–2 microns.

9. A process for producing pigment-useful, finely-divided, non-acicular calcium sulphate comprising mixing with a calcium sulphate containing less combined water than the dihydrate an amount of water ranging from 3–7 times the weight of said calcium sulphate to effect its complete hydration, during said hydration subjecting the mixture to relatively high kneading and shearing action treatment, continuing said treatment until said sulphate crystallizes in finer particle size and in the dihydrate form, and thence dehydrating the resultant product to produce a product which disintegrates, on dehydration, into substantially equidimensional, insoluble anhydrite having a particle size average not over substantially 1-2 microns.

10. A process for producing pigment-useful, finely-divided, non-acicular calcium sulphate comprising mixing with a calcium sulphate containing less combined water than the dihydrate an amount of water ranging from 3-7 times the weight of said calcium sulphate to effect its complete hydration, during said hydration subjecting the mixture to relatively high kneading and shearing action treatment, continuing said treatment until said sulphate crystallizes in finer particle size and in the dihydrate form, and thence calcining the resultant product to produce a product which disintegrates, on calcination, into substantially equidimensional, insoluble anhydrite having a particle size average not over substantially 1-2 microns.

11. A process for producing pigment-useful, finely-divided, non-acicular calcium sulphate comprising completely hydrating a calcium sulphate containing less combined water than the dihydrate by mixing with said sulphate an amount of water ranging from 3-7 times the weight of said calcium sulphate, concurrently with said hydration subjecting the resultant viscous mass to relatively high kneading and shearing action treatment, continuing said treatment until said sulphate crystallizes in finer particle size and in the dihydrate form, and thereafter dehydrating the resultant product within 30 minutes from completion of hydration, whereby the same disintegrates into substantially equidimensional, insoluble anhydrite having a particle size average not over substantially 1-2 microns.

12. A process for producing pigment-useful, finely-divided, non-acicular calcium sulphate comprising completely hydrating a calcium sulphate containing less combined water than the dihydrate by mixing with said sulphate an amount of water ranging from 3-7 times the weight of said calcium sulphate, concurrently with said hydration subjecting the resultant viscous mass to relatively high kneading and shearing action treatment, continuing said treatment until said sulphate crystallizes in finer particle size and in the dihydrate form, and thereafter calcining the resultant product within 30 minutes from completion of hydration, whereby the same disintegrates into substantially equidimensional, insoluble anhydrite having a particle size average not over substantially 1-2 microns.

13. A process for producing pigment-useful, finely-divided, non-acicular calcium sulphate comprising completely hydrating said sulphate by admixing the same with water in such ratio that a substantially plastic, paste-like, viscous mass results, concurrently with said hydration subjecting said mass to relatively high kneading and shearing action treatment, effecting said treatment in the presence of a crystal growth restraining agent, continuing said treatment until said sulphate crystallizes in finer particle size and in the dihydrate form, and thence dehydrating the resultant product, whereby said product disintegrates into substantially equidimensional, insoluble anhydrite having a particle size average not over substantially 1-2 microns.

WINFIELD WALTER HECKERT.